United States Patent [19]

Wood et al.

[11] Patent Number: 5,123,450

[45] Date of Patent: Jun. 23, 1992

[54] FLUID CONTROL VALVE

[75] Inventors: Antony J. Wood, Northants, England; George F. Gocher, Milton Keynes, both of England

[73] Assignee: Ferranti International plc, United Kingdom

[21] Appl. No.: 644,597

[22] Filed: Jan. 23, 1991

[30] Foreign Application Priority Data

Feb. 2, 1990 [GB] United Kingdom ............ 9002356

[51] Int. Cl.$^5$ .......................................... F15B 13/04
[52] U.S. Cl. ............................. 137/625.69; 251/282
[58] Field of Search ................ 137/625.69; 251/282

[56] References Cited

U.S. PATENT DOCUMENTS

| 3,176,721 | 4/1965 | Gordon . |
| 3,199,540 | 8/1965 | Forster . |
| 3,552,442 | 1/1971 | Knowles . |
| 3,563,272 | 2/1971 | Mercier . |
| 3,581,772 | 6/1971 | Wills . |
| 3,590,874 | 7/1971 | Rice . |
| 3,680,577 | 8/1972 | McGeachy . |
| 3,680,593 | 8/1972 | Sorenson . |
| 3,680,596 | 8/1972 | Pickett . |
| 3,952,775 | 4/1976 | Ogata . |
| 3,968,971 | 7/1976 | Mariaulle . |
| 3,990,477 | 11/1976 | Johnson ................ 251/282 X |
| 4,046,165 | 9/1977 | Rose . |
| 4,050,247 | 9/1977 | Connett . |
| 4,084,618 | 4/1978 | Gurries . |
| 4,087,967 | 5/1978 | Knapp . |
| 4,182,375 | 1/1980 | Fukano . |
| 4,418,711 | 12/1983 | Stoll . |
| 4,646,786 | 3/1987 | Harder . |
| 4,741,365 | 5/1988 | Van Ornum . |
| 4,926,906 | 5/1990 | Ichihashi et al. .......... 137/625.69 |

FOREIGN PATENT DOCUMENTS

| 701504 | 12/1953 | United Kingdom . |
| 820797 | 9/1959 | United Kingdom . |
| 1021500 | 3/1966 | United Kingdom . |
| 1324369 | 7/1973 | United Kingdom . |
| 1524891 | 9/1978 | United Kingdom . |
| 2215815A | 9/1989 | United Kingdom . |
| 2215816A | 9/1989 | United Kingdom . |

Primary Examiner—Gerald A. Michalsky
Attorney, Agent, or Firm—Larson and Taylor

[57] ABSTRACT

Figure 2A:
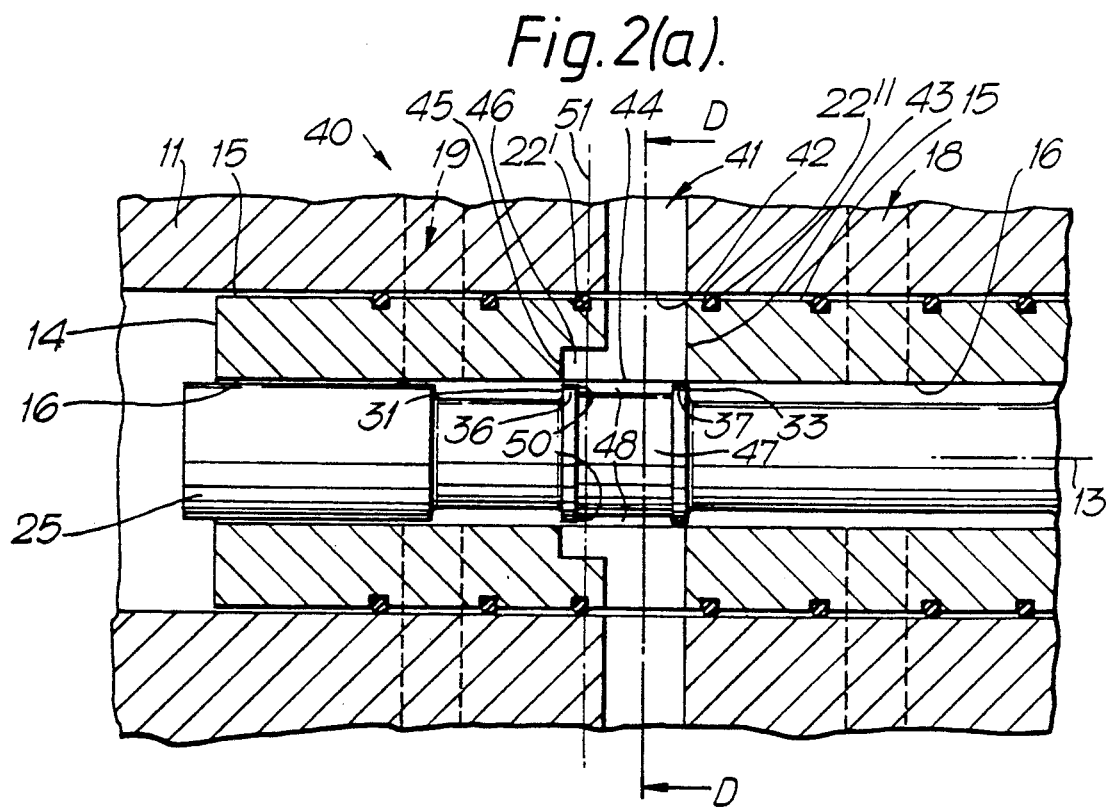

A hydraulic spool valve 40 (FIG. 2(a)) of the edge control type in which the peripheral ends 31, 33 of a spool land 47 cooperate with a radial service port 41 to define by axial spool position the the closure of the port 41 and degree of opening to supply or return port 18, 19. The spool 25 is located in a sleeve 14 itself located in a housing 11 and O-ring seals 22', 22" inhibit leakage between sleeve and housing beyond the seals. Leakage fluid up to the seals exerts a contracting force onto the sleeve and when the spool is in a neutral position closing the service port stiction occurs between the sleeve and the end 36 of the spool land closest to the return port. Both the service port in the sleeve and the spool are constructed such that with the spool in the neutral position the spool groove 48 extends towards the return port so that the end 50 of the groove is at least in line 51 with the O-ring seal 22' and the supporting end region 36 of the spool, inevitably contacting the sleeve, does so at an axial part not subjected to a net contracting fluid pressure.

5 Claims, 4 Drawing Sheets

FLUID CONTROL VALVE

This invention relates to fluid control valves and particularly to so-called spool valves for controlling the flow of hydraulic fluid.

The type of spool valve which the invention is (particularly) concerned has in its simplest form a spool reciprocably mounted in a chamber formed by a cylindrical sleeve itself fixed in a cylindrical shaped aperture in a body and fluid flow ports extending through the body and sleeve to be opened and closed for communication with each other within the sleeve chamber by lands and recesses of the spool in dependence upon the position of the spool within the sleeve.

It will be appreciated that the ports having different functions are disposed at different positions along the longitudinal axis of the sleeve, exemplary ports being a supply port connected to a source of high pressure hydraulic fluid, a service port connected to a device to be operated by the fluid from the supply port to supply fluid at pressure thereto and to return fluid therefrom, and a return port to receive fluid returned through the service port and return it at low pressure to a sump or the like.

Furthermore, each of such ports identified by function may in practice comprise one or more component ports distributed about the circumference of the cylindrical sleeve chamber but aligned with each other along the spool axis. It is therefore usual to refer to a port as such even when it comprises more than one such component port. The circumferential distribution of component ports may be different for different function ports such that the component ports lie in different radial planes along the longitudinal axis of the spool.

The above features are quite common amongst hydraulic spool valves and relate little to the manner in which valve control is exercised.

The particular type of valve with which the invention is concerned is known as an edge control valve wherein the spool has control lands defined by reduced diameter or recessed portions between them, permitting fluid flow along the chamber, and the control lands are a close but sliding fit within the sleeve. Each service port is associated with, and disposed axially between, a supply port and a return port and the spool has a land which at a particular position of the spool within the sleeve, conveniently called the datum or neutral position, the service port is closed by the spool control land.

The service port may be connected to an extensible actuator ram which displaces a control surface against a restoring force. It will be seen that for any restoring force positioning of the valve in the neutral position will trap the hydraulic fluid therein and maintain the ram extension.

Displacement of the spool such that the control land separates the service and supply ports will permit the restoring force on the ram to displace fluid to the return port and move the actuator ram whereas displacement of the spool such that the control land separates the service and retain ports will permit the supply fluid to enter the service port and actuator ram and, by overcoming the restoring force thereon, move the actuator ram.

It will be appreciated that to offer a practical degree of control of actuator ram position the pressure and quantity of fluid in the service port must be controlled and this is achieved by use of a pressure drop across the effective port opening, that is, between the land and portion of the port uncovered by displacing the land. To this end, and to give linearity in terms of service port pressure variation with spool displacement from the point at which the land just closes the port, the land is provided with an abrupt control edge as is the axial end of the port.

Furthermore, in order to preserve that linearity between spool displacement and actuator ram movement, there must be no dead space through which a spool must be displaced from its neutral, service port-closing position before the port begins to communicate with the supply or return port. That is, each control edge of the spool land and each corresponding control edge of the port must be in precise alignment when the spool is in the neutral, service port-closing position.

Such a known type of spool valve is shown in sectional and cross-sectional elevations in FIGS. 1(a) to (c) and described more fully in relation thereto hereinafter.

It will be appreciated that the, or each, component of the service port extends to some extent about the periphery of the spool such that the effective port orifice opened up between spool land control edge and port components may have a significant peripheral extent for small axial length and distribute any heat generated by fluid flow through the small axial orifice evenly about the sleeve and land.

In addition to the above described features of construction and operation it is necessary for the different axially spaced ports (and their components) to communicate between body and sleeve without leakage between ports, the supply port being at a high pressure, the service port being at an intermediate pressure, typically 50–70% of supply pressure, and the return port at low or atmospheric pressure. To summarise what is more fully described hereinafter with reference to the aforementioned FIGS. 1(a) to (c), such leakage is prevented by sealing means of at least one O-ring seal seated in a groove in the sleeve disposed between adjacent ports. Conveniently of pair of O-ring seals are associated with each port, disposed one each side of the port, but it will be appreciated that by the demands of manufacture such seals, however used, are displaced axially from the edges of the ports. Thus, fluid at the port pressure between the sleeve and body extends axially between the pair of O-ring seals associated with the port and acts on the outer cylindrical surface of the sleeve applying a radially inward force tending to compress the sleeve onto the spool, in particular onto the land that is in the vicinity of the service port.

Such a force is known to be a particular problem in such edge control spool valves when the spool is in the neutral position closing off the service port and when the port has been closed, and the spool not displaced, for a period of several seconds.

The radially inward acting force due to fluid at service port pressure acts on the sleeve over the axial separation of the O-ring seals which, as indicated, is longer than the axial length of the port and, by definition for this edge control type of valve, the axial length of the spool land.

The inward force acting between the end of the service port and the O-ring seal disposed at the supply port side thereof is opposed by an outwardly acting force due to fluid at the higher supply port pressure acting on the smaller inner cylindrical surface of the sleeve and such opposing forces may balance or at least result in negligible contraction of the sleeve.

The inward force acting between the end of the service port and the O-ring seal disposed at the return port edge thereof is opposed only by any outwardly acting force due to fluid at the return port pressure and this, acting on the smaller inner cylindrical serface of the sleeve, offers in effect no opposition to contraction of the sleeve onto the sleeve land at least adjacent the control edge thereof closest to the return port.

For the axial length of the port, that is, the part of the sleeve occupied by the spool land, the circumferential portions of the sleeve not occupied by radial port components is subject to the service port fluid pressure and the radially inward force it exerts against the land and not opposed.

Thus in the basic edge control valve structure wherein a sleeve within a body has O-ring seals between sleeve and body disposed axially of the service port, thereis, with the spool in the neutral, service-port-closing portion, a net radially inwardly acting force that tends to contract the sleeve onto the spool land.

As the spool has only limited axial movement from the neutral position the force is always present, varying of course to some extent with the actual fluid pressure on the service port at the precise axial position of the spool land. It is found in practice that with careful manufacture of the components, particularly the clearance between spool land and sleeve taking into consideration likely fluid pressure and resultant forces, it is possible to manufacture a valve in which the sleeve compression causes little problem whilst the spool is in virtually continuous motion to apply continuous control power to the actuator ram or the like connected to the service port.

However, the situation is different when the service port is closed by the spool land and the spool is stationary, 'locking' the actuator ram, for a duration of a few seconds or longer.

After such an operation it is found that considerable force may be required to move the spool at all.

The problem is believed due to static friction, sometimes called stiction, between the spool land and compressed (and tightly fitting) sleeve. As is well known the forces needed to overcome such static friction far outweigh those required to overcome dynamic friction in an already moving arrangement. This problem of stiction has been recognised from very early in development of valves so constructed with separate sleeves and bodies and attempts have been made to reduce the effects of the radially inward sleeve forces on the spool land.

One solution, now almost universally adopted, is to provide an annular chamber between the sleeve and spool land. Such a chamber has the manifold effect of permitting the service port fluid to access a larger part of the inner cylindrical surface of the sleeve, and thus providing a radially outward force opposing contraction, of reducing potential contact area between the sleeve and spool land surface at which point sticking could occur and of joining any component ports to eliminate any lateral thrust on the spool. An example of such an arrangement is disclosed in published British Application No. 2215816A, which is assigned to the same assignee as this application.

Figure 1A:
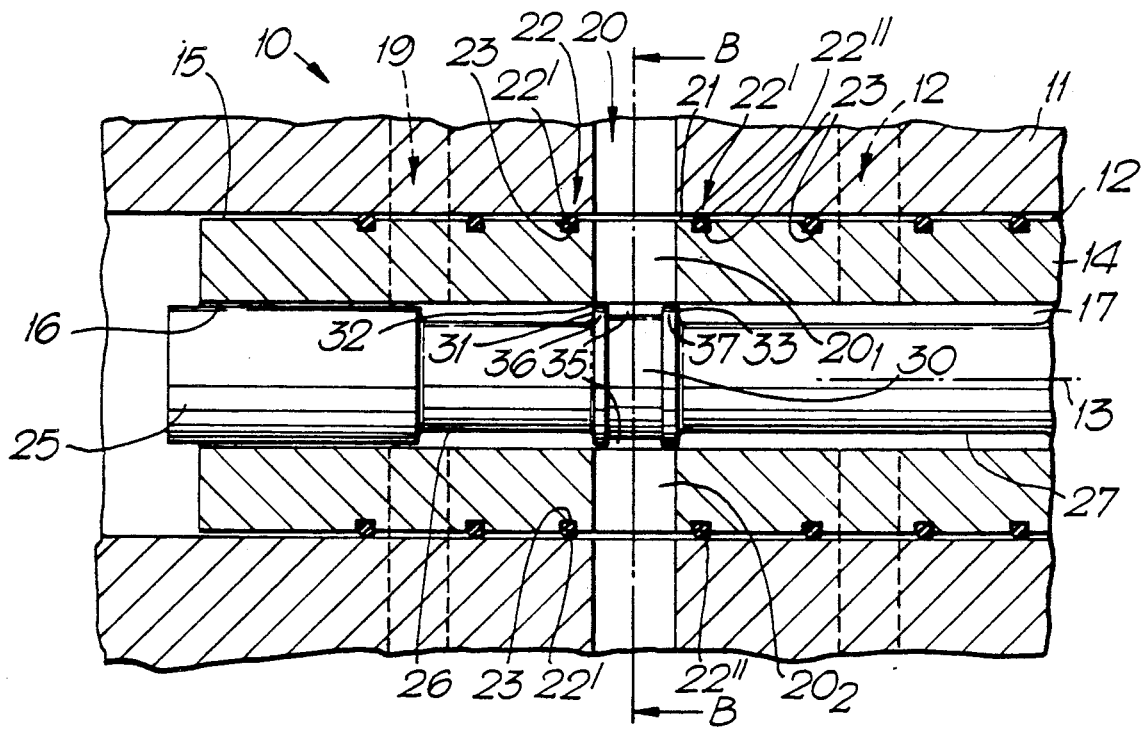
Figure 1B:
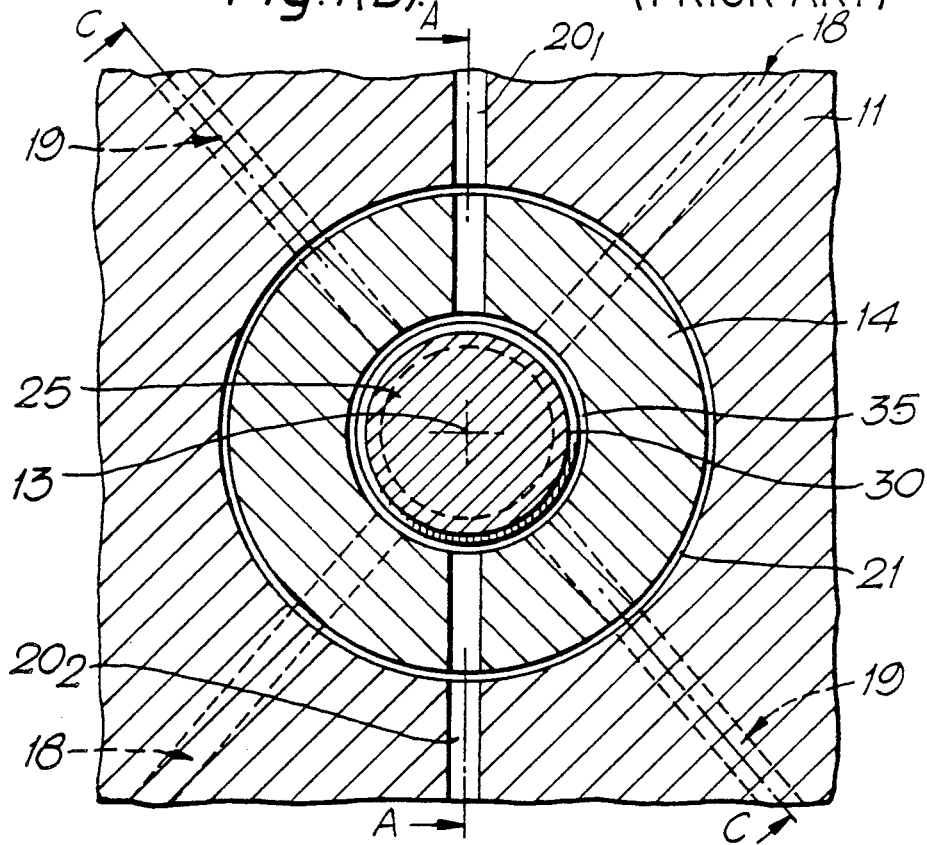
Figure 1C:
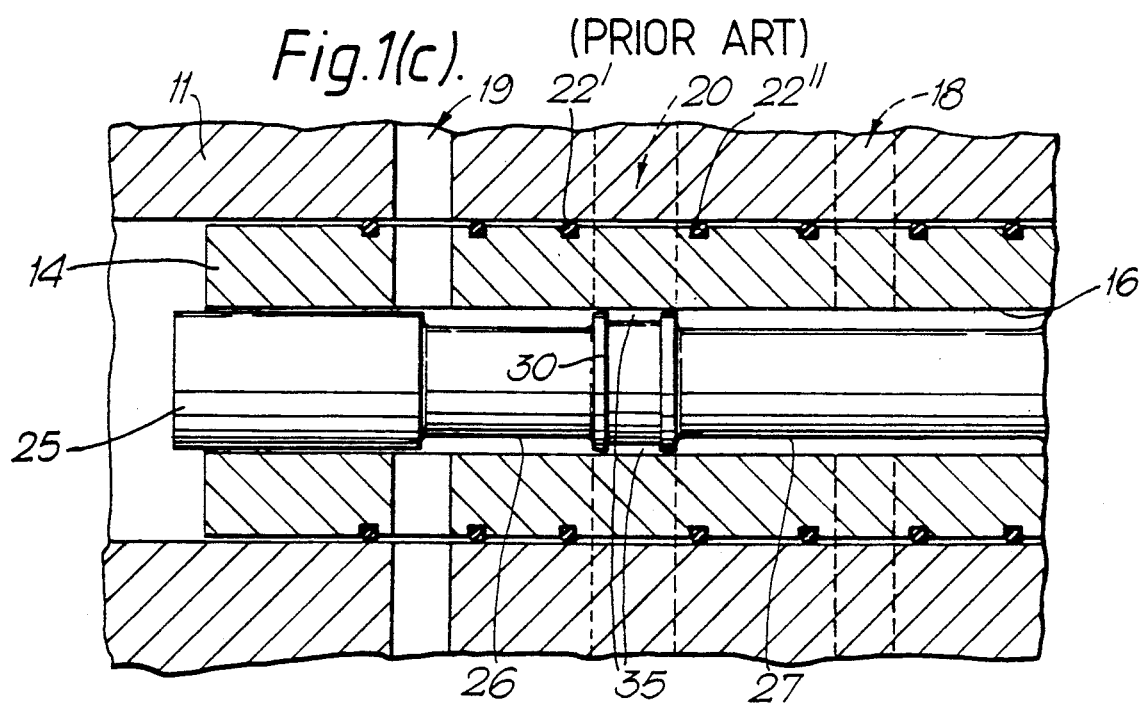

The chamber may be formed as an annular recess in the surface of the spool land as is illustrated in the aforementioned FIG. 1(a)–(c) or in the inner cylindrical surface of the sleeve.

It will be clear however that the axial extent of this recess chamber is limited by the need to provide coincident control edges on spool lands and port at each end of the spool land and the need to provide supporting surfaces on which the spool is borne within the sleeve. That is, there is always a supporting portion of the spool land towards each end of the land, and particularly the end of the land adjacent the return port, for which it is essential to have contact between the spool land surface and the inner surface of the sleeve wherever the port or any port component is not replacing the sleeve up to the control edge.

Historically, having reduced the effective contact area between spool land and sleeve to the narrow bands adjacent to the control edges the forces needed to displace the spool from rest at its neutral position against stiction forces due to moderate fluid supply pressure used have been accommodated by high to medium power or electronic or electromagnetic controllers or by using hydraulic forces in the form of a two-stage valve, wherein fluid controlled in a first stage effects movement of the spool in a second stage. Such drive arrangements have been able to cope with such residual stiction effects provided that they are minimised by careful manufacture.

Modern constraints on space occupied by such control valve arrangements have required physically smaller valve arrangements, in the form of single stage, direct control spool valves, and the use of miniature, low-power, possibly integrated circuit, electronics to control and effect movement of the spool despite a need also to operate with higher fluid pressures.

The corresponding reduction in driving power available to overcome spool stiction, possibly exacerbated by higher fluid pressures, has caused spool stiction in edge control spool valves be a problem in need of effective solution.

One method that has been proposed is to manufacture the valve, in particular the spool and sleeve and the clearances between them at the control edges, with frequent assembly and testing under operating pressure in order to accommodate different contractions to the sleeve at each of the valve lands associated with the, or each, service port. Clearly by adjusting the clearances in manufacture with reference to the particular fluid pressures, the valve is limited to correct operation at such pressures and otherwise standard valves would be non-interchangeable for different tasks. Another method that has been proposed is to apply a high frequency 'dither' force to the spool so that it is never truly static when in the neutral position and the service port is closed. Such a method provides a solution but involves complexity both in providing the dither and thereafter eliminating it from signals in the control loop of the spool valve.

Yet another method intended to alleviate spool sticking has been described in the UK Patent Specification GB 2215815A, the proposal being to lengthen each component of the service port opening into the spool chamber towards the return port by recessing the inner surface of the sleeve to provide a chamber containing fluid at port pressure acting outwardly on the sleeve by way of the recess wall to counter that acting inwardly on the sleeve wall. However, such an arrangement required lengthening of the spool to accommodate the lengthened port but in so doing increased the axial length of spool land surface in contact with the above sleeve surface about its periphery between port components.

The phenomenon of spool sticking and the problems it can cause have also been specifically addressed in UK Patent Specification GB 820797. That specification is concerned with the sticking phenomenon as it occurs within a spool valve of the flow metering type wherein ports are provided by chamfered notches at each end of a spool land.

The differences between that type of spool valve and an edge control valve are emphasised by the different circumstances in which sticking is observed to occur and appear to be largely due to the different nature of the spool land in order to accommodate metering notches. It will be realised that in order to accommodate the notches and otherwise seal the spool chamber the end, supporting, portions of the land are quite extensive in comparison with the edge control valve described above. The solution put forward in GB 820797 is the elongation of the out-of-contact interface between the same spool and sleeve by (i) taking more out of the spool surface in the form of discrete or near-annular grooves or recesses or (ii) in addition to (i) elongating an annular chamber in the surface of the sleeve. However, it will also be appreciated that these solutions are not applicable to an edge control valve of the type described hereinbefore having dimensions to meet any particular design. The length of the interface chamber in the spool of such an edge control valve is already maximised in relation to the overall particular length of the spool land and so embodiment (i) is of no relevance whilst if there is an interface chamber formed as a recess in the sleeve surface as well as the spool surface then merely elongating the recess to reduce contact between the sleeve and land near its control edge according to (ii) would remove contact between sleeve and spool land near its control edge, that is, take away the sleeve wall which is both the supporting surface for the supporting portions of the spool and against which the control edges have to work, and is also not relevant. Notwithstanding the other differences apparent in the valve construction and how the sticking problem manifests itself, a specification whose aim is to reduce further the area of contact between the sleeve and spool land surface, which has already been minimised in the valve type of interest, contributes no solution to the instant problem.

It is an object of the present invention to provide by simple manufacturing modifications to the spool and sleeve a fluid spool valve of the edge control type described in which the effects of the spool stiction at the surface port are mitigated for all supply fluid pressures.

According to the present invention an edge control spool valve comprises a body having a sleeve aperture therein the longitudinal axis of which defines an axial direction in the valve, a sleeve within a sleeve aperture of the body and defining by its interior an axially extending spool chamber, axially spaced fluid supply and return ports and between them a service port, each port comprising at least one port component extending through the sleeve between the sleeve aperture and the spool chamber and separated from the other port components about the periphery of the spool chamber and all service port components, at least at the spool chamber, being all of the same length in the axial direction, sealing means in the sleeve aperture between the sleeve and the body to prevent leakage of fluid (along the aperture) between axially spaced ports, components of the sealing means associated with each port being displaced axially from any port component opening into the outer surface of the sleeve, a spool slidable axially in the spool chamber having a longitudinal axis extending along the axial direction, portions of reduced cross section along its length defining fluid passageways along the spool chamber and a land of the same axial length as the service port, each end of the land substantially filling the spool chamber and providing a control edge, extending about the periphery of the land, operable to close the spool chamber from the service port when in a neutral axial position, and an annular interface chamber between the sleeve and spool land extending about the periphery of the spool and in an axial direction, the annular interface chamber having such axial dimensions that for all spool dispositions supporting portions of the spool land adjacent said control edge support the spool land in the sleeve between each end of the interface chamber and the supply and return ports and when the spool is disposed in the neutral axial disposition said interface chamber extends axially towards the return port to at least the effective axial disposition of that component of the sealing means for the service port between the service and the return port, said control edge of the spool being displaced from the end of said interface chamber towards the return port by said supporting portion of the spool land and the opening of the inner sleeve surface of each surface port component extending axially into alignment with said control edge.

Embodiments of the invention will now be described by way of example with reference to the accompanying drawings, in which:

FIG. 1(a) is a sectional elevation through a single stage edge control hydraulic spool valve of known form, the valve spool being carried within a spool chamber in a sleeve itself carried in a body and with fluid supply and return ports spaced axially each side of a service port, fluid flow between the service port and return ports by way of the spool chamber being controlled by a spool land capable of closing off the service port, FIG. 1(b) is a cross sectional elevation through the valve of FIG. 1(a) along the line BB, the elevation of FIG. 1(a) being along the line AA of FIG. 1(b), FIG. 1(c) is a sectional elevation through the valve of FIG. 1(a) but taken at a different position about the longitudinal axis of the spool, along the line CC of FIG. 1(b).

Figure 3A:
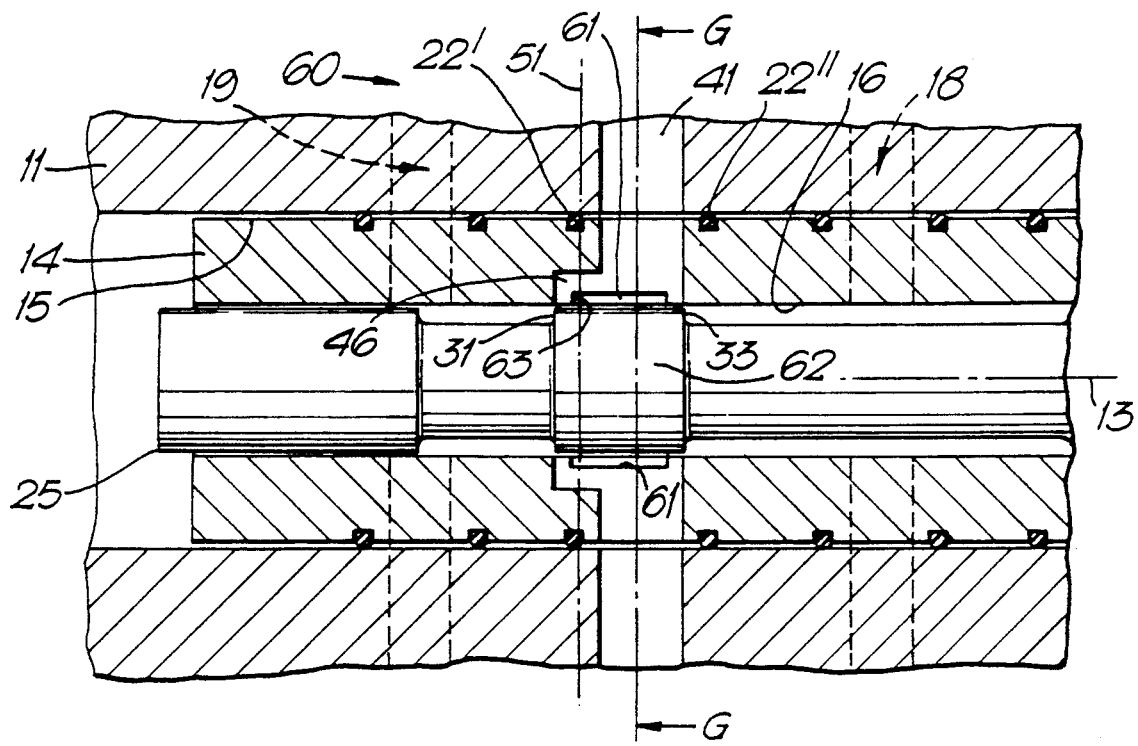

FIG. 2(a) is a sectional elevation through a portion of a first form of a single stage edge control hydraulic spool valve according to the present invention showing an interface chamber between sleeve and spool land comprising an annular recess in the surface of the spool land, the elevation section being in the plane of the service port along the line EE of the cross sectional elevation of FIG. 2(b), FIG. 2(b) is a cross sectional elevation through the valve of FIG. 2(a) along the line DD thereof, FIG. 2(c) is a sectional elevation through the valve of FIG. 2(a) taken at a different position about the longitudinal axis of the spool along the line FF of FIG. 2(b), FIG. 3(a) is a sectional elevation through a portion of second form of single stage edge control hydraulic spool valve according to the present invention showing an interface chamber between sleeve and spool land comprising an annular recess in the surface of the spool land, the elevation section being in the plane of the service port along the line HH of the cross sectional elevation of FIG. 3(*b*), FIG. 3(*b*) is a cross sectional elevation through the valve of FIG. 3(*a*) along the line GG thereof, and FIG. 3(*c*) is a sectional elevation through the valve of FIG. 3(*a*) taken at a different position about the longitudinal axis of the spool along the line II of FIG. 3(*b*).

Referring to FIGS. 1(*a*), (*b*) and (*c*), these show a known form of edge control spool valve 10 comprising a body 11 having a sleeve aperture 12 therein. The longitudinal axis 13 of the aperture defines an axial direction in the valve. Sleeve 14 is located in the sleeve aperture and has an outer sleeve surface 15 and an inner sleeve surface 16, the latter of which defines the boundary of a spool chamber 17.

The valve also comprises axially spaced fluid supply port 18 and return port 19 both out of the plane of the FIG. 1(*a*), and shown by broken lines, and between them a service port 20. Each port that is distinguished by function, that is, supply, return or service, comprises at least one port component, such as $20_1$ or $20_2$ of service port 20, extending through the sleeve between the sleeve aperture 12 and spool chamber 17, or, alternatively stated, between the outer and inner sleeve surfaces 15 and 16 and separated from other port components about the periphery of the spool chamber. Each port irrespective of the number of components occupies a particular axial position and axial extent, all components of at least the service port being of the same axial dimensions. The functional ports also extend through the body 11. It will be understood that where there are a plurality of components to any port a similar number of component ports may extend through the body 11 or a single port or a different number of ports may extend through the body communicating with the individual component ports in the sleeve by means of an annular passageway (not shown) extending about the outer surface 15 of the sleeve or the surface of the body defining the sleeve aperture 12.

Notwithstanding the formation of a specific annular passageway there is at the interface between sleeve and body an inevitable residual passageway 21 in the sleeve aperture that would permit fluid flowing between body and sleeve to leak axially along the sleeve aperture between the functional ports 18, 19 and 20.

To prevent such leakage it is usual to provide sealing means, shown generally at 22, in passageway 21 between the sleeve and body, the sealing means having component parts such as O-rings which are disposed between adjacent functional ports, or more usually disposed as a pair one on each side of each functional port in an axial direction, such as O-ring seal 22' and 22" associated with the service port. It will be appreciated that the O-ring seals are located within annular grooves 23 in the outer surface of the sleeve (and or possibly the inner surface of the body) and that as an inevitable consequence of manufacture or accommodating assembly tolerances such grooves and the O-rings they contain are displaced axially from the port. The O-ring seal 22 associated with the service port 20 and at the side thereof closest to the return port, and particularly its axial separation from the service port, is of particular importance and will be discussed more fully hereinafter.

The spool chamber 17 contains a spool 25 which has a longitudinal axis extending along the axial direction of the valve and conveniently conincident with the longitudinal axis 13 of the sleeve aperture.

Portions 26, 27 of the spool of reduced cross section along its length define fluid passageways along the spool chamber 17 and a spool land 30 of the same axial length as service port 20 substantially fills the spool chamber in the vicinity of the service port.

It will also be seen from FIG. 1(*a*) that when the spool is given an axial disposition shown the land 30 effectively closes the service port 20 from the spool chamber 17. Such axial disposition is conveniently called its neutral disposition.

Referring also to FIGS. 1(*b*) and (*c*) it will be seen that communication between the service port and spool chamber is controlled by axial displacement of the spool from the neutral position wherein a gap opens between an edge of the spool land (say 31) and the edge of the port (say 32). The profiles of these edges are critical to the performance of the valve and the edge of the spool land particularly is referred to as the control edge. There is of course one control edge at each end of the spool land at 31 and 33, the control edges extending around the periphery of land so as to cooperate with any component of the service port disposed about the longitudinal axis. This is particularly useful if the spool has a circular cross section as valve operation is independent of spool operation.

It will be seen that although the spool land, being no longer axially than each service port component, is, in the neutral position, supported in the sleeve only by the parts of the sleeve between components of the service port.

The valve 10 is used to control the pressure of fluid in an external device, such as a hydraulic ram connected to the service port, by displacing the spool from its neutral position to connect the service port to either the supply port 18 or return port 19. The extent of displacement and the orifice created by the control edges institutes a pressure drop that enables an operating pressure to be established in the service port and maintained by subsequent closure of the port by returning the spool to the neutral position. Typically in such operation the pressure of fluid in a closed service port is 50% to 70% of the supply port pressure.

It is found in such valves that when the spool has been undisturbed in the neutral position for a period of several seconds there is a resistance of subsequent spool displacement which may require considerable force to overcome. Once the spool is mobile it is thereafter capable of controlled displacement with much lower axial forces.

The effect prevents satisfactory operation of the valve and is recognised as a static friction, or stiction, effect due largely to an inwardly acting force on the sleeve tending to 'clamp' it onto the spool land. The force is produced by the action of service port fluid in the aperture 21 between the port 20 and its associated seals 22' and 22". The fluid pressure acting on the outer surface of the sleeve results in an inwardly acting force tending to collapse it onto the spool. Clearly the fluid pressure material and thickness of the sleeve have some effect on how much it distorts but it can be shown for instance that above an optimum thickness the corresponding increase in outside surface area merely results in increased force for the same fluid pressure.

Although this phenomenon affects the sleeve for the whole axial length between seals 22' and 22" it will be appreciated that the spool chamber 17 between land 30 and supply port 18 is at supply pressure and produces by way of the internal wall 16 of the sleeve an outwardly acting counter force that relieves sticking between the end of the spool land, in the vicinity of control edge 33, and the sleeve. The spool chamber 17 between land 30 and return port 19 is at low pressure and offers no counter force to sleeve contraction to the end of the spool.

Accordingly it is well understood that it is fluid pressure acting on the outer surface 15 of the sleeve from the centre of the service port 20 to the sealing means component 22' that results in spool sticking at the neutral position.

To minimise the effects and provide communication between components of the service port an annular interface chamber is usually formed between sleeve and spool land. Most commonly, and as shown, the interface chamber comprises an annular recess 35 in the surface of the spool land extending axially for less then the length of the land leaving at each end supporting portions 36, 37 which, by substantially filling the spool chamber, support the spool land therein and defines the control edges 31 and 33. It will be understood that the contact area between spool land and sleeve and other benefits obtainable from an annual interface chamber may be achieved by having the chamber formed as an annular recess in the inner surface 16 of the sleeve about the periphery of the spool chamber. Such recess may be instead of, or in addition to, one in the spool surface.

It will be appreciated that taking all detailed factors associated with valve design into consideration the necessary supporting portion 36 of appropriate length is in contact with the inner sleeve surface around its periphery except where it abuts a service port component as in FIG. 1(a).

The valve structure described above with reference to FIGS. 1(a), 1(b) and 1(c) is known and is representative of the prior art. Electromagnetic or high power electronic devices have been able to overcome the sticking between spool and sleeve to the extent that this has been reduced by a relatively small contact area of supporting portion 36.

However, sticking does still occur and has hitherto precluded the use of low power solid state control circuits.

Although solutions to the problem of sticking have been proposed none has dealt with the need for the supporting portion 36 to be within the axial boundary of the service port and sticking that ensues therewith.

In accordance with the present invention an edge control spool valve 40 is shown in FIGS. 2(a) to (c) which corresponds to FIGS. 1(a) to (c) in terms of viewpoint and many parts are common to valves 10 and 40. Accordingly such common parts are given like reference numbers.

Referring to FIG. 2(a) the service port 41, or each component thereof, extends through the sleeve from outer surface 15 to inner surface 16. The centre of the opening 42 of each port component at the outer surface of the sleeve is disposed centrally between the components of the sealing means associated with the service ports, that is, midway between O-rings 22' and 22''. The wall 43 of the port aperture closest to the supply port defines the axial extremity of the port opening 44 at the inner sleeve surface 16 as in the known valve 10.

However, the port opening 44 is elongated in an axial direction and extends towards the return port, the end 45 of the port closest to the return port being defined by a recessed portion 46 of the inner sleeve surface. The centre of the inner surface opening 44 corresponding to that of the centre of the spool land when the spool is in neutral, port closing, position is thus axially offset from that of outer surface opening 42.

The spool land 47, like spool land 30 of valve 10, has an annular recess 48 therein which provides an interface chamber between spool land and sleeve, being separated from the control edges at the end of the land by the aforementioned supporting portions 36 and 37.

The length of the spool land is chosen so that when the spool is in its neutral position and the control edge 33, closest to the supply port, is aligned with the edge 43 of the port the end 50 of the spool recess closest to the return port extends towards the return port to at least the effective disposition of the component 22' of the sealing means for the service port. If it can be assumed that the effect of the O-ring seal 22' is to restrict the action of service port fluid pressure to between the surface of the O-ring 22' that is closest to the port and the other O-ring 22'' then the plane orthogonal to longitudinal axial 13, indicated at 51, marks the effective axial displacement of the sealing means from the port. Clearly, the spool land may be made longer than illustrated such that the end 50 of the spool recess is disposed beyond the effective axial disposition 51 of the seal component 22'.

The recessed portion 46 of each port component also extends axially beyond the effective axial disposition 51 of the seal component the end wall 45 being formed in axial alignment with the portion occupied by the control edge 31 of the spool land 47 in the neutral position, that is, displaced from the position occupied by recess end 50 by the length of supporting portion 36.

It will be appreciated that in other sectional planes and more clearly shown in FIG. 2(c) the service port fluid pressure acting on the outer surface of the sleeve between the seal components 22' and 22'' is now opposed by port and supply fluid pressure resulting in less deformation of the sleeve and furthermore that any deformation which does occur is only against the annular recess 48 not the supporting land 36 which is now axially beyond the limit of where fluid pressure acts on the sleeve. The production of an outwardly acting counterforce due to port pressure is not confined to the wall of the interface chamber between service port components but also on the recessed portion of the port undercutting the O-ring seal 22'. The valve structure in accordance with the invention is simple in concept and relatively simple to implement in manufacture, requiring only the axial extension of the port component openings 44 by means of recess 46 and the production of a longer spool, the machining operations associated with its manufacture being otherwise unchanged.

Figure 3B:
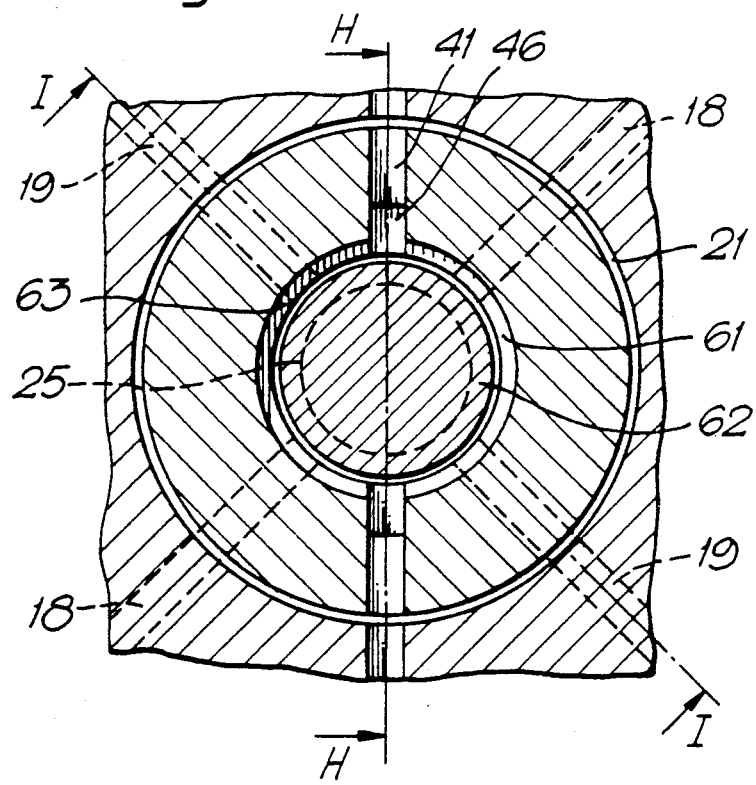
Figure 3C:
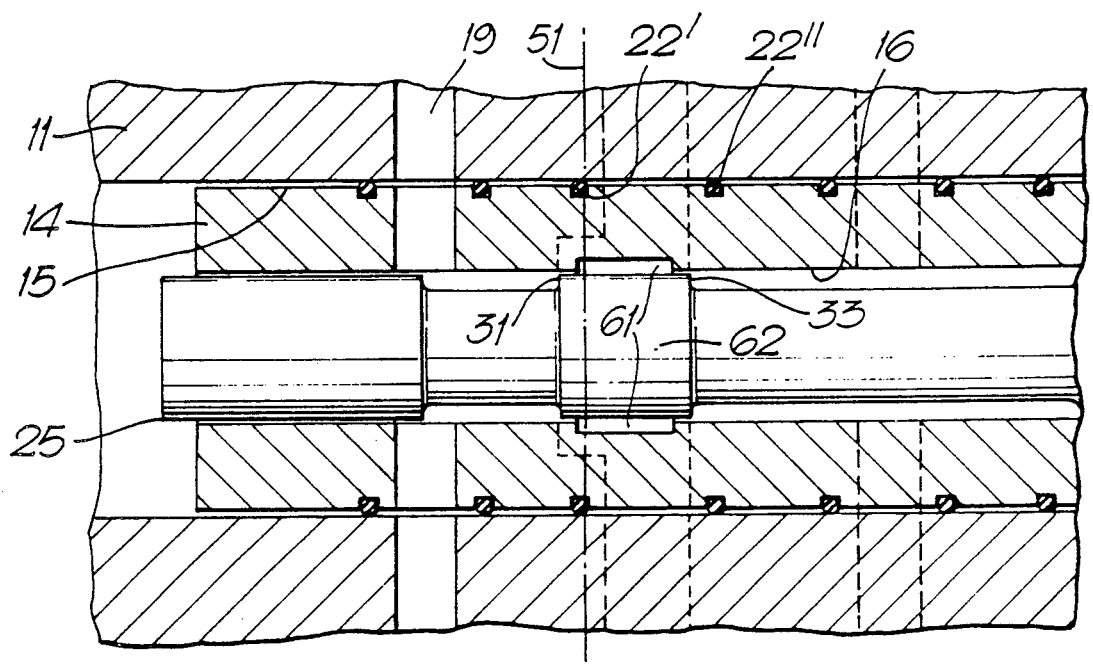

It will be understood that the annular interface chamber defined between sleeve and spool land may, instead of recess 48 in the spool land, be formed by a recess in the inner surface 16 of the sleeve, as shown in valve arrangements 60 shown in FIGS. 3(a) to (c).

The sleeve, in particular the port component configuration, is the same as in valve 40 except for the annular recess 61 which has conveniently the same axial length as the spool recess 48 of valve 40 but less than the length of the extended port. The spool land 62 has a surface of uniform cross section between control edges 31 and 33, the supporting portions (corresponding to 36 and 37) being those parts in engagement with the sleeve adjacent to each end of the sleeve recess 61. This supporting arrangements differs slightly from that of spool 47 in that the axial length of each supporting region will be seen to vary as the spool is displaced from its axial position and the maximum spool displacement is limited by the need to avoid the displaced spool becoming unsupported at one end.

The sleeve recess 61 is disposed such that its end 63 closest to the return port is at least displaced axially to the effective axial disposition 51 of the component 22' of the sealing means. It will again be seen more readily from FIG. 3(c) that fluid produced inwardly acting sleeve forces are countered by fluid produced outwardly acting sleeve forces and the supporting portion of the spool is in contact with the axial portion of the sleeve not subject to such forces.

It will be appreciated that the valve according to the present invention may be configured in different ways without departing from the scope of the invention. For instance, the modified port components shown in the sleeve in valves 40 and 60 are assymetrical axially, being extended only towards the return port. If desired the inner opening part of each service port component may be extended also towards the supply port such that the outer surface opening 42 is centrally disposed with respect to inner surface opening 44. The spool land would then require to be correspondingly longer. In the above arrangement, the extended port opening in the inner sleeve surface requires a longer spool. As an alternative which may be more difficult to manufacture, each port component may be configured in the sleeve so that the port openings at the inner and outer sleeve surfaces are of the same axial length but offset in the axial direction to the extent described above in accordance with the invention, the main benefit of this being that an existing spool length, as in 10, may be employed.

We claim:

1. An edge control spool valve comprising
   a body having a sleeve aperture therein the longitudinal axis of which defines an axial direction in the valve,
   a sleeve within a sleeve aperture of the body and defining by its interior an axially extending spool chamber,
   axially spaced fluid supply and return ports and between them a service port, each port comprising at least one port component extending through the sleeve between the sleeve aperture and the spool chamber and separated from the other port components about the periphery of the spool chamber and all service port components, at least at the spool chamber, being all of the same length in the axial direction,
   sealing means in the sleeve aperture between the sleeve and the body to prevent leakage of fluid along the aperture, between axially spaced ports, components of the sealing means associated with each port being displaced axially from any port component opening into the outer surface of the sleeve,
   a spool slidable axially in the spool chamber having a longitudinal axis extending along the axial direction, portions of reduced cross section along its length defining fluid passageways along the spool chamber and a land of the same axial length as the service port, each end of the land substantially filling the spool chamber and providing a control edge, extending about the periphery of the land, operable to close the spool chamber from the service port when in a neutral axial position, and
   an annular interface chamber between the sleeve and spool land extending about the periphery of the spool and in an axial direction, the annular interface chamber having such axial dimensions that for all spool dispositions, supporting portions of the spool land adjacent said control edge support the spool land in the sleeve between each end of the interface chamber and the supply and return ports and when the spool is disposed in the neutral axial disposition said interface chamber extends axially towards the return port to at least the effective axial disposition of that component of the sealing means for the service port between the service and the return port, said control edge of the spool being displaced from the end of said interface chamber towards the return port by said supporting portion of the spool land and the opening of the inner sleeve surface of each surface port component extending axially into alignment with said control edge.

2. A valve as claimed in claim 1 in which the centre of the opening of each service port component at the outer sleeve surface is disposed centrally between the components of sealing means associated with the port and the centre of the opening of each service port component at the inner sleeve surface is displaced axially from the centre of the opening to the outer sleeve surface towards the return port.

3. A valve as claimed in claim 2 in which each service port component has an axial length of opening at the inner sleeve surface longer than the axial length of the opening at the outer sleeve surface.

4. A valve as claimed in claim 3 in which each component of the service port comprises a through aperture extending through the sleeve between the outer and inner sleeve surfaces such that the wall of the aperture closest to the supply port defines the axial extremity of the port at the inner sleeve surface towards the supply port and a recessed portion of the inner sleeve surface defines an axial elevation of the port at the inner sleeve surface towards the return port.

5. A valve as claimed in claim 1 in which the annular interface chamber comprises an annular recess extending completely about the periphery of the spool land.

* * * * *